US011678188B2

(12) United States Patent
Sym et al.

(10) Patent No.: US 11,678,188 B2
(45) Date of Patent: *Jun. 13, 2023

(54) ALERTING SYSTEMS AND METHODS

(71) Applicant: Single Digits Connection, LLC, Bedford, NH (US)

(72) Inventors: Michael Sym, Austin, TX (US); Craig Needels, San Antonio, TX (US)

(73) Assignee: SINGLE DIGITS CONNECTION, LLC, Bedford, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/460,945

(22) Filed: Aug. 30, 2021

(65) Prior Publication Data

US 2022/0116779 A1 Apr. 14, 2022

Related U.S. Application Data

(63) Continuation of application No. 16/150,220, filed on Oct. 2, 2018, now Pat. No. 11,109,232.

(60) Provisional application No. 62/567,676, filed on Oct. 3, 2017.

(51) Int. Cl.
| | |
|---|---|
| *H04L 9/40* | (2022.01) |
| *H04W 12/08* | (2021.01) |
| *H04L 41/14* | (2022.01) |
| *H04L 41/18* | (2022.01) |
| *H04W 84/12* | (2009.01) |
| *H04L 41/042* | (2022.01) |

(52) U.S. Cl.
CPC ............. *H04W 12/08* (2013.01); *H04L 41/14* (2013.01); *H04L 41/18* (2013.01); *H04L 63/0892* (2013.01); *H04L 41/042* (2013.01); *H04W 84/12* (2013.01)

(58) Field of Classification Search
CPC .......................... H04W 12/08; H04L 63/0892
See application file for complete search history.

(56) References Cited

U.S. PATENT DOCUMENTS

| | | | |
|---|---|---|---|
| 9,137,739 B2* | 9/2015 | Raleigh | ................... H04L 67/55 |
| 10,200,866 B1* | 2/2019 | Cratsenburg | ........ H04L 63/0892 |
| 10,595,199 B2* | 3/2020 | Tg | ....................... H04W 12/082 |
| 2008/0065746 A1* | 3/2008 | Moghaddam | ......... H04W 12/08 |
| | | | 709/220 |

(Continued)

*Primary Examiner* — William S Powers
(74) *Attorney, Agent, or Firm* — Grossman, Tucker, Perreault & Pfleger PLLC

(57) ABSTRACT

Embodiments of the present invention adapt interconnect systems to apply automated rules and analytics to the Authentication, Authorization, and Accounting ("AAA") messages between providers that are handled by the interconnect system. The automated rules and analytics interpret or convert the administrative messages into a measure of technical performance of the visited network in relation to a corresponding home network provider. As part of this process, the system establishes a procedure that matches messages involving a device to be related and produces a data structure and corresponding data that is stored and reflects the performance or other salient data points. The structure of the data is set of extracted and calculated data that is derived from the messages and is assembled to reflect operation at the level of each administrative messaging session, involving a request to the home network provider to join a visited network.

20 Claims, 10 Drawing Sheets

(56) References Cited

U.S. PATENT DOCUMENTS

2015/0237527 A1* 8/2015 Knutson ............. H04W 12/068
　　　　　　　　　　　　　　　　　　　　726/4
2015/0288767 A1* 10/2015 Fargano ............. H04L 41/5054
　　　　　　　　　　　　　　　　　　　　709/227

* cited by examiner

Configuration UI: Add Alert

Step 1: Configure Clause 1
VNP Identifier = {i.e., VNP123} —— 605a
HSP Identifier = {i.e., HSP456} —— 605b
Traffic Type Identifier = {i.e., EAP or non-EAP traffic} —— 605c
Request Type Identifier = {Access, Accounting} —— 605d
Response Type Identifier = {Accept, Challenge, Reject, Timeout} —— 605e
Response Time Identifier = {Request, RoundTrip, Response, Full} —— 605f

— 605

Step 2: Select Relational Operator —— 610
Relational Operator = {=, >, <} —— 610a

Fig. 5

Configuration UI: Add Alert

STEP 3: Select Type of Alert
Volume = an alert based on the # of specified transactions —— 615a
Response Time = an alert based on the response times of specified transactions.—— 615b
Percentage = an alert based on percent of transactions meeting the criteria against the number of requests. A minimum number of transactions can be specified.—— 615c

615

STEP 4: Select Amount for Type of Alert —— 620
Volume:        Response Time:        Percentage:
 620a STEP 5: Select GMT Timeframe this Alert is Active (optional) —— 630
MonitorTimeStart = 0000, MonitorTimeEnd = 2359 —— 630a STEP 6: Select Interval to Monitor —— 625
MonitorInterval = previous X seconds to check, <= 86400
 625a

Fig. 6

Configuration UI: Add Alert

STEP 7: Select Who Should be Notified —— 635

STEP 8: Assign a Title to the Alert (will be put in email subject line)

| Alert Requests | | | | | |
|---|---|---|---|---|---|
| ID | Alert Type | Description | HSP Account | VNP Account | Active |
| XYZ001 | Volume | Zero transactions for the last 25 minutes (Daytime hours) | HSP005 | VNP002 | Yes |
| XYZ002 | Volume | 80% rejects for the last 30 minutes | HSP005 | VNP002 | Yes |
| XYZ003 | Percentage | Timeouts – 5% threshold exceeded on VNP concourse | HSP005 | VNP007 | Yes |
| WWW001 | Percentage | Zero transactions for the last hour (Evening hours) | HSP002 | VNP009 | Yes |
| WWW002 | Volume | Alert for HSP or VNP traffic is below threshold | HSP005 | VNP011 | Yes |
| APP001 | Percentage | Warning Timeout Alert for VNP on Network 567 | HSP001 | VNP016 | Yes |

Fig. 9

Email Example:

ALERTING SYSTEMS AND METHODS

CROSS-REFERENCE TO RELATED APPLICATIONS

This application claims the benefit of U.S. Application 62/567,676, filed Oct. 3, 2017, the entirety of which is herein incorporated by reference.

FIELD OF THE INVENTION

The present invention generally relates to systems and methods, and in particular, to systems and methods that are configurable by users to provide specific technical analytics and alerts for sessions between a home service provider WiFi network (HSP) and a visited network provider WiFi network (VSP). Such sessions comprise a group of related messages associated to a subscriber event on a visited network.

BACKGROUND OF THE INVENTION

The use of WiFi networks and in particular the use of such networks by mobile devices has significantly increased over recent years and is expected to continue to increase as new generations of WiFi are released and implemented. With respect to mobile devices, a significant number of such devices are mobile phones that receive wireless network services on a subscription basis from a particular network provider. The network provider allows the subscribers' device to join their cellular network and use it to perform voice and data communications (often times with a certain subscribed budget of data or voice usage on the cellular data network). These devices almost always have WiFi capability and can use that capability for various purposes including as an alternative to using the cellular data networks. Increasingly, there is a desire by service providers to benefit subscribers with the ability to access WiFi networks as part of their subscription service or through some other packaging, in different locations when they are away from their home geographic area (e.g. to avoid roaming charges) or even within their geographic home area (e.g., in order to reduce their cellular data usage). Various providers have WiFi networks that they offer as a resource to other providers (e.g., cellular network providers) and there is existing infrastructure by service providers that enable devices to use and join WiFi networks as visited networks that are permissioned to provide services to a home provider's devices. This infrastructure involves the proper authentication, authorization, and accounting of charges between providers that result from the use of a visited network.

One of the challenges in this field of technology is that the technical performance of a visited or home network provider can be difficult to evaluate and monitor. For example, the visited network provider may not be performing well with respect to devices of a certain home network provider. More specifically in this example, there may be too many rejected requests to join the network or there may be a significant delay in processing or allowing a device to join a visited network.

SUMMARY OF THE INVENTION

In accordance with principles of the invention, a WiFi roaming settlement and authorization system is contemplated. The system comprises a hub that interconnects a plurality of administration servers on networks of different provider networks. The plurality of administration servers include a set of administration servers of different home network providers and a set of administration servers of different visited network providers. The system includes a computing device configured using computer executable instructions and non-volatile memory.

The administration servers of different visited network providers can establish individual administrative messaging sessions in response to the administration servers of different visited network providers receiving individual requests from subscriber devices to join a visited WiFi network of the visited network provider. Each session is between an administration server of a visited network provider and an administration server of a home network provider determined by the computing device to be associated with the subscriber device. The session comprises administrative messages structured in accordance with an Authentication, Authorization, and Accounting Protocol (AAA Protocol).

The computing device is also configured to read one or more administrative messages in individual administrative messaging sessions and in response, determine that the administration server of the home network provider sent a message through the interconnect hub that authorized the requesting subscriber device to join the visited WiFi network to establish a roaming session on the visited WiFi network. The computing device then performs settlement logic between the visited network provider providing the visited WiFi network and the home network provider of the subscriber device based on the information read from the one or more administrative messages in the individual administrative messaging sessions.

In response to receiving, transmitting, and reading the one or more messages, the computing device captures operational performance data based on the administrative messages that comprises determining a time when one or more messages in individual administrative messaging sessions were received or transmitted by the interconnect hub. The computing device calculates one or more differences between the determined times in the administrative messaging session. The computing device produces a data record for individual administrative messaging sessions that contains an identifier for the visited network provider and contains one or more of the determined times and time differences in association with the home network provider (or its administration server). The computing device aggregates and saves the data records in a data repository.

The interconnect hub further comprises an analytics server. The analytics server may, for example, be external to the network providers and configured using computer executable instructions and non-volatile memory. The analytics server can store and use a set of customizable rules to specify one or more technical alerts with respect to one or more operational relationships between individual administration servers of different visited network providers and individual administration servers of different home network providers. External in this context refers to being external from a logical, network domain, or network control perspective, which can include being physical external. For example, a component owned and operated by the visited network provider or home network provider would be considered external to the analytics server. The interconnect hub may also be external to the analytics server and/or a component owned and operated by the visited network provider or home network provider.

The analytics server further applies the customizable rules to the aggregated data in the data repository and generates an alert message for the home network provider when one of the customizable rules is satisfied. The rules may be applied on a continuous basis. The alert message comprises information about a particular operating condition generated based on the administrative messages handled by the interconnect hub.

The determined times may include, for example, a time the interconnect hub receives an administrative message from the visited network provider (time 1), a time the interconnect hub forwards the administrative message to the home network provider (time 2), a time the interconnect hub receives the administrative message from the home network provider (time 3), a time the interconnect hub transmits the administrative message to the visited network provider (time 4), or a combination thereof.

The calculated time differences may include, for example, a time difference between the time the interconnect hub receives an administrative message from the visited network provider (time 1) and the time the interconnect hub transmits the administrative message to the visited network provider (time 4).

The calculated time differences may also include a time difference that represents a latency of the interconnect hub, a time difference that represents a latency of the home network provider (or its administration sever), and a combination there of.

Another embodiment of the present invention is also contemplated. In the second embodiment, the system comprises a data hub including one or more computers that interconnect home network providers with visited network providers that provide wireless network services to devices of the home network providers. The data hub communicates accounting and authorization messages between administrative servers of the visited network providers and administrative servers of the home network providers. The data hub is further configured to collect and calculate other data from the accounting and authorization messages and apply an analytics application to the other data that applies rules to the other data that are configured to indicate the communications performance between the visited network provider and home network provider.

The data hub is further configured to receive and transmit messages between the visited administrative servers and the home administrative servers. The visited administrative servers receive messages from the devices of the home network provider subscribers requesting the use of the services provided by the visited network provider. The visited administrative servers transmit the received messages to the data hub. The data hub receives the transmitted messages and then forwards the messages to the home administrative servers. The home administrative servers receive the messages, and are configured to generate messages in response to the received messages and send the generated messages to the data hub. The data hub receives the generated messages and then forwards the generated messages to the visited administrative servers. The visited administrative servers then transmit the generated messages to the devices of the home network provider subscribers.

The calculated other data may include a time when the data hub receives or transmits a message and a time difference between the time the data hub receives the message and the time the data hub transmits the message.

The data hub may further comprise an analytics server that stores and applies the rules and that allows users of the system to customize the rules to generate one or more alerts including the communications performance information. The data hub is further configured to aggregate collected data, and the analytics server may apply the rules to the aggregated data on a continuous basis based on a rolling time window that extends from the most recent collected other data back to a previous collected other data. The analytics server generates the one or more alerts when one of the rules is satisfied.

In accordance with principles of the invention, a computer implemented method for generating alerts or producing operational information between visited network providers and home network providers is contemplated. The method comprises establishing an administrative messaging session including administrative messages structured in accordance with an Authentication, Authorization, and Accounting Protocol between a plurality of administrative servers of different visited network providers and a plurality of administrative servers of different home network providers. The step of establishing the session is executed in response to requests from subscriber devices of the home network providers to join visited WiFi networks provided by the visited network providers. The session is between one of the visited network providers and the home network provider associated with the subscriber device.

The method also comprises reading, by an interconnect hub interconnecting the visited administrative servers and the home administrative servers, one or more administrative messages in individual administrative messaging sessions and in response, determining, by the interconnect hub, that the home network provider sent a message through the interconnect hub that authorized the requesting subscriber device to join the visited WiFi network to establish a roaming session on the visited WiFi network.

In response to receiving, transmitting, and reading one or more messages in the message exchange, the method captures, by the interconnect hub, operational performance data based on the administrative messages that comprises determining a time when one or more messages in individual administrative messaging sessions were received or transmitted by the interconnect hub. The method also calculates, by the interconnect hub, one or more differences between the determined times in the administrative messaging session and produces, by the interconnect hub, a data record for individual administrative messaging sessions that contains an identifier for the visited network provider and contains one or more of the determined time and time differences in association with the home network provider. The method further aggregates and saves, by the interconnect hub, the data records in a data repository.

The method further comprises storing and using a set of customizable rules, through an analytics server configured using computer executable instructions and non-volatile memory, to specify one or more technical alerts with respect to one or more operational relationships between individual home networks and individual visited networks. The analytics server, for example, may be external to the visited and home network providers. External in this context refers to being external from a logical, network domain, or network control perspective, which can include being physical external. For example, a component owned and operated by the visited network provider or home network provider would be considered external to the analytics server. The interconnect hub may also be external to the analytics server and/or a component owned and operated by the visited network provider or home network provider.

The method may further comprise applying the customizable rules, by the analytics server, to the aggregated data in the data repository on a continuous basis based on a rolling time window that extends from the most recent collected data back to a previous collected data.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 5 depicts illustrative parameters and conditions created using the parameters in accordance with some embodiments of the present invention;

FIG. 6 depicts illustrative parameters and conditions created using the parameters in accordance with some embodiments of the present invention;

FIG. 7 depicts illustrative parameters and conditions created using the parameters in accordance with some embodiments of the present invention;

FIG. 9 depicts an illustrative list showing all the alert requests that have been created in accordance with some embodiments of the present invention.

DETAILED DESCRIPTION OF THE INVENTION

Embodiments of the present invention adapt interconnect systems to apply automated rules and analytics to the Authentication, Authorization, and Accounting ("AAA") messages between providers that are handled by the interconnect system. The automated rules and analytics interpret or convert the administrative messages into a measure of technical performance between the visited network and home network provider. This information representing the interrelationship performance is at the provider level and is not specific to an individual device or subscriber. The technology is able to convert accounting or administrative messaging to have technical significance. As mentioned above, this is an area in which providers have been unable to adequately evaluate. This area is also expected to be of increasing significance as the volume of subscribers, the amount of data, and number of AAA exchanges is significantly increased. As part of this process, the system establishes a process that matches messages involving a device to be related and produces a data structure and corresponding data that is stored and reflects the performance or other salient data points. The structure of the data is set of extracted and calculated data that is derived from the messages and is assembled to reflect operation at the level of each administrative messaging session (involving a request to the home network provider to join a visited network). Interconnect systems may be known as WiFi roaming settlement and authorization systems. In some embodiments, it is contemplated that the invention is not limited to interconnect systems, WiFi, or exclude all personal information for a device.

Figure 1:
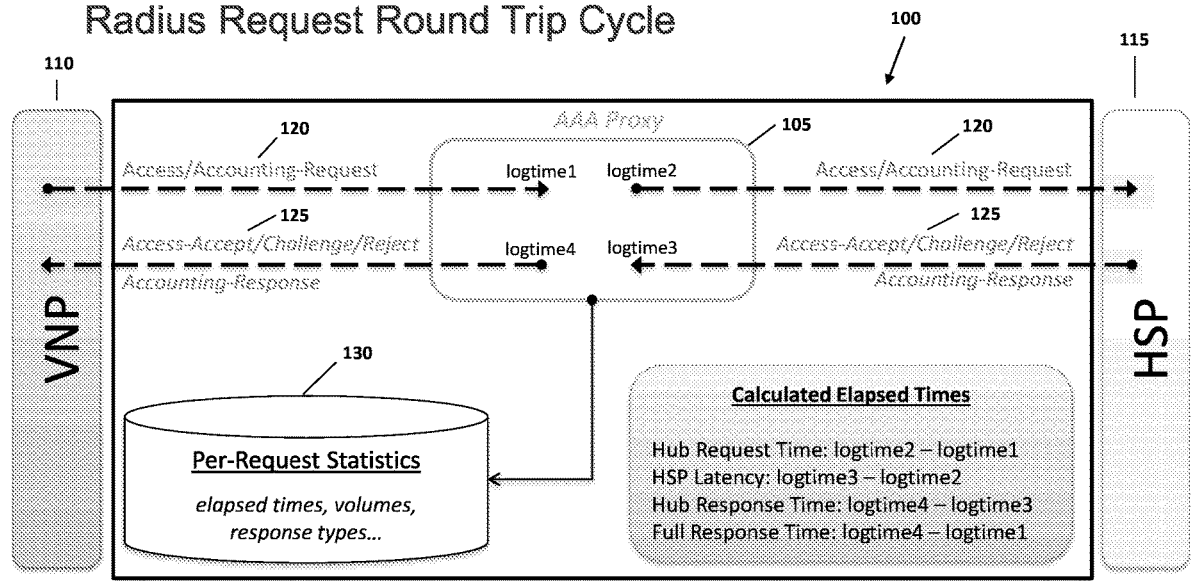
FIG. 1 depicts an illustrative alert system, as part of an interconnect system, in accordance with some embodiments of the present invention.

FIG. 1 depicts one embodiment of an alerting system 100, as part of an interconnect system, in accordance with some embodiments of the present invention. The system 100 comprises an AAA server 105, The AAA server 105 communicates with a visited network provider (VNP) system 110 and a home service provider (HSP) system 115. The server 105, system 110, and system 115 communicate based on AAA protocols. AAA protocols are also known as Authentication, Authorization and Accounting protocols. The server 105 is configured to receive communications 120 from the VNP system 110 that are directed to the HSP 115 system and communications 125 from the HSP 115 system that are directed to the VNP system 110. The server 105 is also configured to transmit the received communications 120 to the HSP system 115 and the received communications 125 to the VNP system 110. Communications 125 are communications generated in response to the received communications 120. Without the server 105, the VNP system 110 and the HSP 115 system communicate directly. The VNP system 110 is owned or operated by a visited network provider. The VNP system 110 includes access points to provide a WiFi network of the visited network provider or a network provider different from the home service provider to subscriber devices, and an administration server configured to communicate with the access points and the server 105. The HSP 115 system is owned or operated by a home service provider, and includes an administration server configured to communicate with the server 105. The administration server of the VNP system 110 and the administration server of the HSP system 115 can communicate via the server 105. The server 105 may be an interconnect hub that interconnects the administration servers and that includes a computing device configured to perform the operations of the interconnect hub.

The server 105 records a first time (logtime 1) upon receiving communications 120 and a second time (logtime 2) upon transmitting the received communications 120. The server 105 records a third time (longtime 3) upon receiving communications 125 and a fourth time (logtime 4) upon transmitting the received communications 125. The server 105 can determine the time difference between the recorded times. The server 105 includes a timer to determine each time. The server 105 can determine the time difference between logtime 2 and logtime 1 (which represents a processing time by the server 105 or AAA request time), between logtime 3 and logtime 2 (which represents latency of the HSP system 115), between logtime 4 and logtime 3 (which represents a processing time by the server 105 or AAA response time), and between logtime 4 and logtime 1, (which represents the total amount of time of the two processing times of the server 105 and the latency of the HSP system 115 or full response time). Each time difference can be several microseconds and may be referred to as elapsed time.

The processing time of the server 105 may refer to the time server 105 needs to record the time, save the recorded time in a storage, calculate the time difference, recognize the network provider (e.g., HSP being telecommunications company A and VNP being telecommunications company B) and mobile device (or account number) that transmits the communication, recognize the type of communication (e.g., Accept, Challenge, Reject, and Timeout), recognize the type of traffic (e.g., EAP or non-EAP traffic), keep track of the number of communications that have been received from and transmitted to the VNP system 110 and the HSP system (including the number of roundtrip communications), or a combination thereof. The server 105 is configured to record logtimes 1-4 for each roundtrip cycle of communications between the VNP system 110 and the HSP system 115.

From the perspective of AAA protocols, communication 120 may be either an access request or accounting request (request message). The communication 120 received by the server 105 is also the communication 120 transmitted by server. In other words, the server 105 forwards the received communication 120 to the HSP system 115. For example, after receiving the access request 120 (or accounting request), the server 105 forwards the same access request 120 (or accounting request) to the HSP system 115, Communication 125 may be either an access response or accounting response (response message). An access response may be an access accept, access challenge, or access reject. Either an access response or accounting response may also be a timeout. A request message or a response message may be referred to as an administrative message. When the HSP system 115 receives a request message (e.g., access request), the HSP system 115 generates a corresponding response message (e.g., access response or access accept if access is granted), Each roundtrip between the VNP system 110 and the HSP system 115 made by administrative messages (regardless what the access response is, accept or reject) may be referred to as an administrative messaging session. in some embodiments, an administrative messaging session may include multiple roundtrips. An administrative messaging session is used to determine whether a roaming session should be established on the visited WiFi network. The term "session" used in this application refers to administrative messaging session unless otherwise noted.

In addition to recording and saving logtime 1-4 in a storage 130, the server 105 also records (or identifies) and saves other information in the storage 130. The other information may include, but is not limited to, (1) identification of network provider (HSP being, for example, telecommunications or cable company A and VNP being, for example, another telecommunications or cable company B or WiFi network provider C), (2) subscriber's HSP and VNP account numbers, (3) type of traffic (e.g., EAP or non-EAP traffic, with EAP stands for stands for extensible authentication protocol), (4) type of request message (e.g., access request or accounting request), (5) type of response message (e.g., accept, challenge, reject, or timeout), (6) type of elapsed time (e.g., AAA request time, HSP latency, AAA response time, or full response time), (7) the number of request messages sent by the VNP system 110 (or received by the HSP system 115), (8) the number of response messages sent by the HSP system 115 (or received by the VNP 110 system), (9) the number of roundtrip communications between the VNP system 110 and the HSP system 115, or a combination thereof. These information may be obtained from their respective communication 120 or 125 by the server 105, For example, information (1)-(4) may be determined upon receiving a request message 120, information (5) may be determined upon receiving a response message 125, information (6) may be determined as each type of elapsed time is calculated, information (7)-(8) may be determined as each message is received and added to the sum, and information (9) may be determined as each roundtrip is completed and added to the sum. The storage 130 may be volatile or non-volatile storage.

Figure 2:
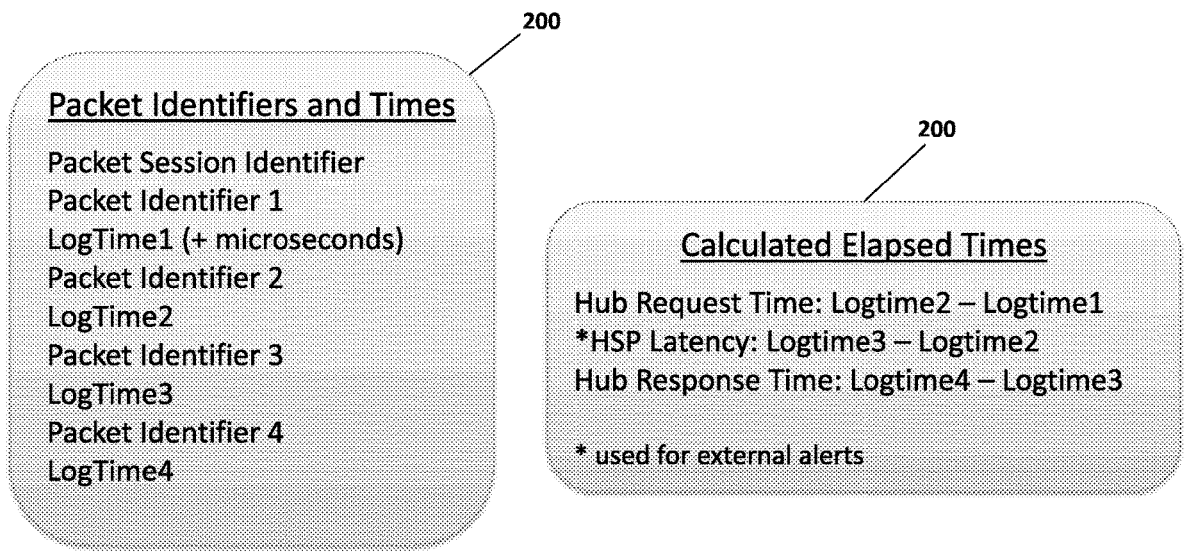
FIG. 2 depicts illustrative identifiers in accordance with some embodiments of the present invention.
Figure 3:
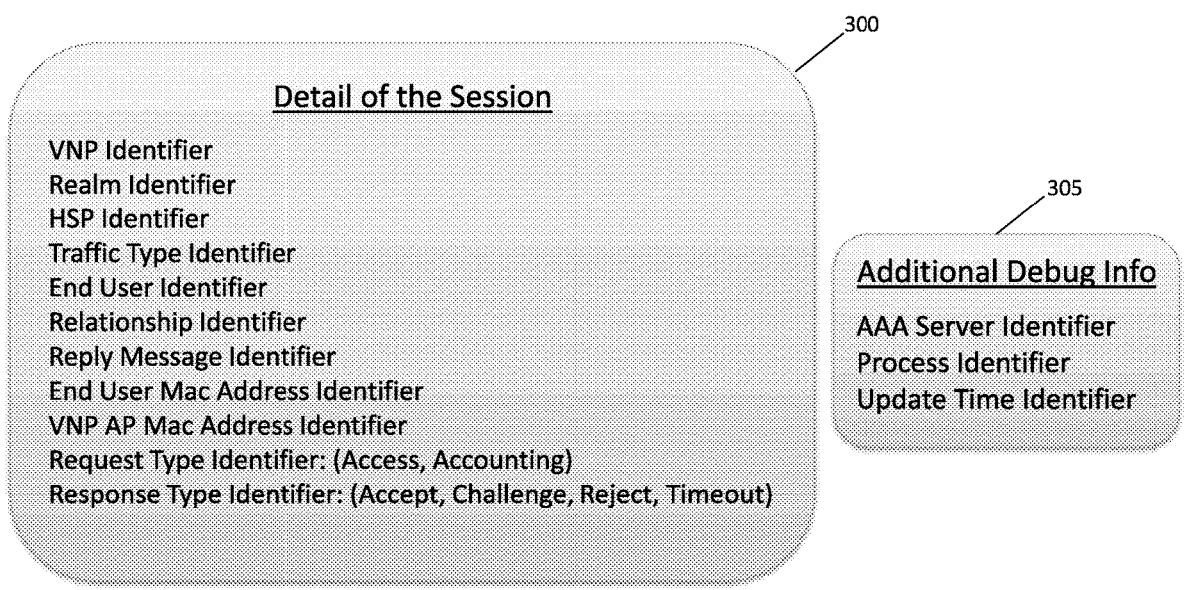
FIG. 3 depicts illustrative identifiers in accordance with some embodiments of the present invention.

All the information above may be structured and saved into the storage 130 on a per session basis. The information in each session may be structured by a set of identifiers. FIGS. 2-3 depict illustrative identifiers 200, 300 in accordance with some embodiments of the present invention. Referring to FIG. 2, the identifiers 200 may include a session identifier (e.g., Packet Session Identifier, which indicates the roundtrip between the VNP system 110 and the HSP system 115), a first received communication identifier (e.g., Packet Identifier 1, which indicates the communication 120 from the VNP system 110 to the server 105), a logtime 1 identifier (e.g., LogTime 1), a first transmitted communication identifier (e.g., Packet identifier 2, which indicates the communication 120 from the server 105 to the HSP system 115), a logtime 2 identifier (e.g., LogTime 2), a second received communication identifier (e.g., Packet Identifier 3, which indicates the communication 125 from the HSP system 115 to the server 105), a logtime 3 identifier (e.g., LogTime 3), a second transmitted communication identifier (e.g., Packet Identifier 4, which indicates the communication 125 from the server 105 to the HSP system 115), and a logtime 4 identifier (e.g., LogTime 4). Each logtime identifier is followed by the corresponding recorded time (in microseconds). Each of the remaining identifiers is followed by a code indicating the corresponding information.

The identifiers 200 may also include elapsed time identifiers such as AAA Request Time (with associated information being the time difference between Logtime 2 and Logtime 1), HSP Latency (with associated being the time difference between Logtime 3 and Logtime 2), AAA Response Time (with associated information being the time difference between Logtime 4 and Logtime 3), and Full Response Time (with associated information being the time difference between Logtime 4 and Logtime 1). Each identifier is followed by the corresponding time difference discussed above.

Figure 4:
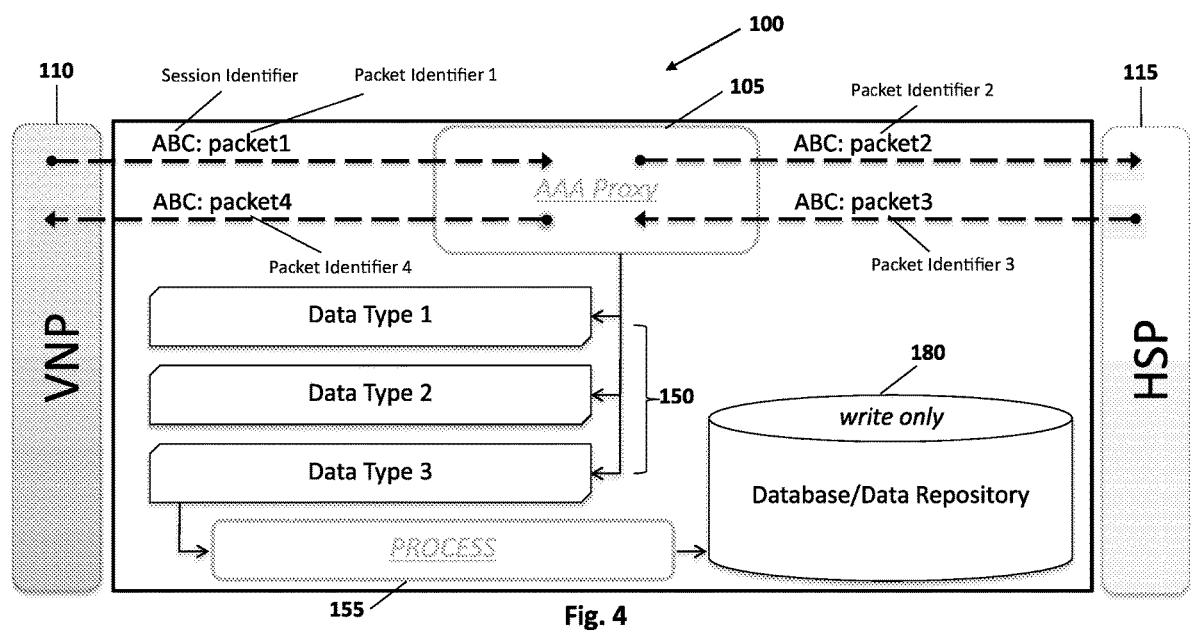
FIG. 4 depicts components of the alert system identified by some illustrative identifiers in accordance with some embodiments of the present invention.

FIG. 4 depicts components of the system 100 identified by some of the above identifiers and an illustrative process 155 of the server 105 that structures and saves the data 150 the server 105 obtained to a database or data repository 180. The process 155 may be the process that creates the tables discussed below. The tables are saved to the database 180. The database 180 is available to the analytics server to determine whether a configured condition is met.

The session identifier may also include a plurality of transaction identifiers 300. The identifiers 300 may include a VNP identifier or a VNP account number identifier, a realm identifier that identifies the area of the VNP that sent the communication (e.g., an identifier that indicates the VNP area is an airport), a HSP identifier or a HSP account number identifier (e.g., which may he determined from the IP address), a traffic type identifier (e.g., an EAP identifier), an end user identifier that identifies the end user or the mobile device of the end user, a relationship identifier that identifies the relationship between the VNP and HSP, a reply message identifier that identifies a reply message from the VNP or HSP, an end user Mac Address identifier, a VNP access point Mac Address identifier, a request type identifier, and a response type identifier. Each identifier is followed by its associated information such as a code that represents a network provider or an actual account number, EPA traffic, access, and accept, respectively. The identifiers 300 also include debug identifiers such as a AAA server identifier that identifies the server that receives and transmits the communication, a process identifier that identifies that process that added data, and an update time identifier that identifies the time the data was loaded. The associated information is based on the recorded information mentioned above. Preferably, the structured information is arranged such that the session identifier and its associated information precedes other identifiers and their associated information. Since there are multiple sessions between the VNP system 110 and the HSP system 115, the server 105 creates multiple tables and each table is created whenever a session concludes (e.g., when a communication completes a roundtrip, and the response message can be accept, challenge, reject, or timeout). Each session operates independently of the other sessions, therefore, the creation of the table of each session also occurs independently of the creation of the other tables. If two or more sessions conclude at the same time, the creation of the tables of the two or more sessions can also occur at the same time. The server 105 may generate a file with multiple tables (with one table following another table) showing all the results or some results between a period of time. The table is created when logtime 4 is recorded or immediately after logtime 4 is recorded. The table may also be created immediately before, immediately after, or simultaneously as the server 105 transmits the response message (packet4, FIG. 4) to the VNP system 110. The result may be structured and saved in other formats (e.g., chart, diagram, graph, etc.) and generated as different file types (e.g., Word, PDF, Powerpoint, Excel, etc.).

It should be noted that the above method of recording, structuring, and saving the other information is only an exemplary embodiment of the present invention. The present invention also encompasses other possible methods as long as the other information can he recorded, structured, and/or saved in the data depository for access by the AAA server and the analytics server and for determining whether a configured alert is met.

In one embodiment, the server includes a process that creates a log that records the information obtained by the server in a period of time, that saves the recorded information temporality on the server, and that saves the recorded information from different period of times to the database simultaneously at a later time. For example, the process may create a log that records the information obtained by the server in an one-hour period for every hour, save the information in each log temporarily on the server, and then save all the information on the server to the database once every five hours. This process eliminates the need for the server to write the obtained information to the database every time the server receives information and reduces the delay associated with writing to the database, which may be a disk, frequently.

In one embodiment, the result can be further organized according to one or more durations and be available to the analytics server in the one or more durations for determining whether a configured condition is met. The analytics server can check the data records in the appropriate duration to make a determination based on the configured condition. The duration may be one hour, two hour, twelve hour, or other duration. The result may he organized by one or more windows having such a duration. The window may be applied to the data records on a continuous basis such that the window always covers the most recent data record back to a previous data record that is captured or produced at a time that corresponds to the duration of the window. For example, the system may be configured with two windows with one having a duration of one hour and another one having a duration of two hours. When the configured condition is directed to detecting a condition in a 15-minute period, the analytics server only needs to check the data records in the one-hour window to determine whether the configured condition is met. In this way, the system can review a smaller amount of data and perform faster.

The server 105 can be configured to send alerts to users when the server 105 determines that information in the tables meet certain conditions. The conditions can be set up by using one or more parameters. FIGS. 5 and 6 depict illustrative parameters and setting up conditions using those parameters in accordance with some embodiments of the present invention. The parameters may include parameters 605 that the identifiers and associated information in the tables need to match, a relational parameter 610, alert type parameters 615, amount of alert type parameters 620, and a monitoring interval parameter 625.

The parameters 605 may include a field 605a to specify a VNP (or a VNP account number), a field 605b to specify a HSP (or a HSP account number), a field 605c to specify traffic type (EAP non-EAP, or both), a field 605d to specify request message type (access or accounting), a field 605e to specify response message type (accept, challenge, reject, or timeout), and a field 605f to specify elapsed time type (AAA request time, HSP latency, AAA response time, or full response time). One or more of these fields can be specified. When, for example, the identifiers and associated information in the tables match the specified fields (or the tables contain information specified in the fields), an alert is generated. This may be one of several conditions that need to meet by the information in the tables in order to generate an alert.

The relational parameter 610 may include a field to specify a relationship such as greater than, less than, or equal to. This may also be one of several conditions that need to meet by the information in the tables in order to generate an alert.

The alert type parameter 615 (FIG. 6) may include a field 615a to specify the type of alert on which the alert is based. The type may be specified to be volume, which means an alert is based on the number of sessions (or tables), response time, which means an alert is based on an elapsed time, or percentage, which means an alert is based on a percentage of sessions meeting the condition set by the alert against the number of subscriber devices requesting to join the visited network. The field 615 may be allowed to specify more than one type. The amount parameters 620 may include a field 620 to specify a number for the specified type parameter 615. For example, the type may he selected to the volume and the amount for the volume may be selected to be 100. This may also be one of several conditions that need to meet by the tables (number of tables or information in the tables) in order to generate an alert.

The monitoring interval parameter 625 may include a field 625a to specify an amount of time in which the above parameters are monitored from the tables. The specified amount instructs the server 105 to check the above parameters and the tables in the past for the specified amount. The specified amount can be in seconds, minutes, or hours. For example, the amount of time may be specified to be 14,400 seconds or 4 hours, and the server 105 would check the tables generated in the past 4 hours. This may also be one of several conditions that need to meet by the information in the tables in order to generate an alert. The information in each table includes a time indicating when the table is created. The parameters may optionally include an alert active parameter 630. The parameter 630 includes a field 630a to specify a period of time which the alert feature of the server 105 is active. The field 630a may allow specifying a start time and an end time. When information in the tables meet the set-up conditions or parameters between the start time and the end time, the alert is generated and send to the users. When information in the tables meet the set-up conditions or parameters outside that period of time, no alert is sent to the users. When the parameter 630 is turned off or the parameters do not include the parameter 630, an alert can be configured using the other parameters.

When all the set-up conditions or parameters are met, the server 105 generates an alert and sends it to users. The server 105 can be configured to send the alert to particular users and the alert can include an alert title and an alert description. The particular users can be specified and the title and description can be provided via fields 635, 640, respectively (FIG. 7). The alert may be in the form of email, text message, or similar communication.

Figure 8:
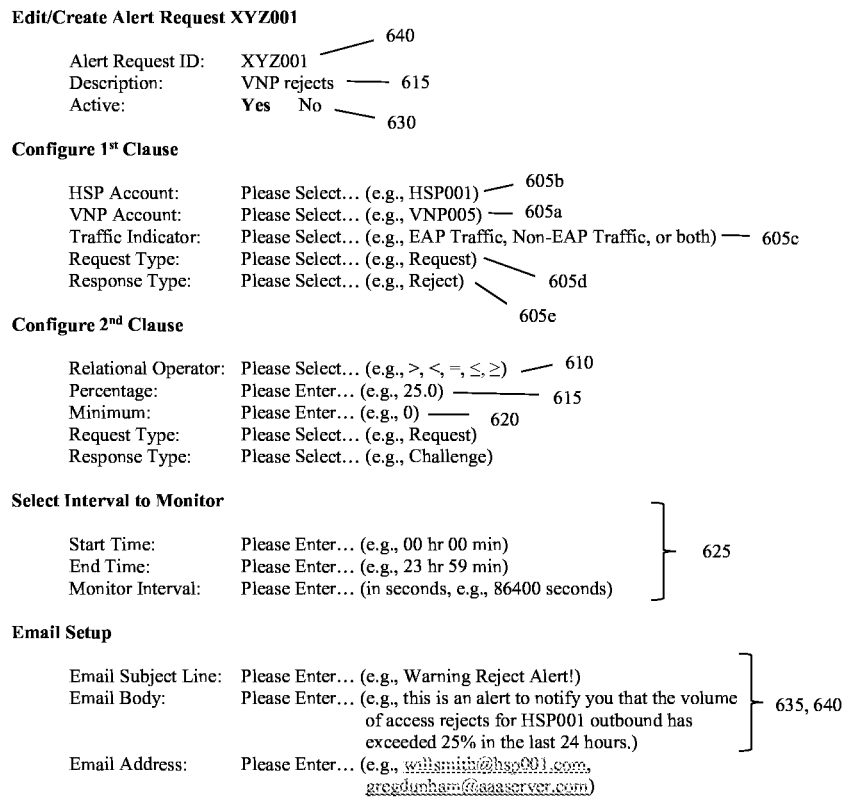
FIG. 8 depicts an illustrative user interface for entering parameters and creating conditions in accordance with some embodiments of the present invention.

All the conditions/parameter and fields can be presented to a user through a user interface provided by the server 105. FIG. 8 depicts an illustrative user interface 800 with reference numbers showing corresponding parameters or fields. A user can prepare an alert request using the interface 800 which is processed by the server 105 to generate a corresponding alert. An alert request contains all the necessary parameters, individuals to receive the alert, and alert title and description. Multiple requests can be created and multiple alerts can be generated. FIG. 9 depicts an illustrative list showing all the alert requests that have been created.

In one of the alert requests, the user may have specified that the HSP is HSP005 (which represents a specific telecommunications company), that the request message type is access, and that the response message type is reject. The user may have also specified that the relationship is greater than, that the alert type is volume, that the number of volume is 500, and that the monitoring interval is past 86400 seconds (24 hours). The user may have also provided an alert description. Based on these conditions, an alert is generated and send by the server when it determines, from the tables or sessions, that HSP005 rejects access request more than 500 times for the past 24 hours. In another one of the alert requests, the user may have specified that the HSP is HSP005, that the VNP is VNP002 (which represents another specific telecommunications company), and that the request message type is access. The user may have also specified that the relationship is equal to, that the alert type is volume, that the number of volume is 500, that the alert is active between 8:30 am and 5:30 pm, and that the monitoring interval is 1800 seconds (30 minutes). The user may have also provided an alert description. Based on these conditions, an alert is generated and send by the server when it determines, from the tables or sessions, that access request from VNP002 to HSP005 is 0 for the past 30 minutes between 8:30 am and 5:30 pm.

The alert description may also be prepared by the server according to a format and the format include several fields that can be modified, added, or removed by the server according to the conditions specified.

Figure 10:
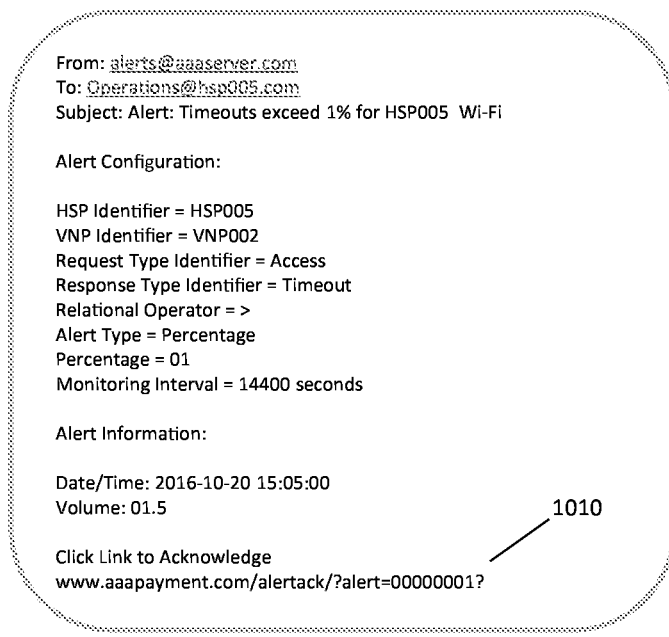
FIG. 10 depicts an illustrative alert sent by the server in accordance with some embodiments of the present invention.

FIG. 10 depicts an illustrative alert 1000 sent by the server. The alert 1000 is an email that includes the specified conditions (alert configuration) for which the alert is generated. The alert title may appear in the subject line of the email and the alert description may appear in the body of the email. The alert 1000 also includes an acknowledge command 1010 (e.g., a link or button) that the individual received the alert can activate or click to acknowledge the alert. Once the alert is acknowledged, no further alert or emails will be sent for that configured conditions until a recovery resets. A recovery email will still be sent when alerts have been acknowledged. This recovery email marks the end of the acknowledgement for that alert. After recovery, all alert emails will be sent again as normal once a condition is triggered. The option to acknowledge this new alert will also appear again.

The server may generate and sends alerts in real-time or on a deferred basis. Real time means that the time difference between the moment when the specified conditions are observed and the moment when user receives the alert is undetectable to user (or the delay in receiving the alert from the moment the specified conditions are observed is undetectable to user). The server can also store the alerts in the storage for statistics and reporting purposes. Deferred basis means that the generation or transmission of the alert is intentionally delayed by the server or the user (through alert configuration) and/or that the aforementioned time difference is noticeable to the user. The alerts may be generated as soon as the configured condition is observed but not sent to the user until a specific time. The alerts may also be generated and transmitted at a later time after the configured condition is observed.

Another illustrative operation of the system 100 based on the aforementioned information is described. The system is configured to receive individual requests from individual subscriber devices to join a visited network of a visited network provider via access points and an administration server of the visited network provider. In response to the received requests, the administration server establishes an administrative messaging session comprising administrative messages that are structured in accordance with Authentication, Authorization, and Accounting Protocols (AAA protocols) with an administration server of a home network provider determined by the interconnect hub to be associated with the subscriber device. For example, the interconnect hub can determine that a subscriber device's primary cellular network subscription is with a particular network. Subscriber devices may include desktop computers, laptop computers, smartphones, PDAs, tablets, and other types of computers.

The interconnect hub interconnects a plurality of administration servers of different visited network providers with a plurality of administration servers of different home network providers, including the visiting and home administration servers mentioned above. The interconnect hub receives and reads one or more administrative messages in individual administrative message sessions sent by the visited administration server. The interconnect hub then forwards the administrative messages to the home administration server. In response to the received messages, the home administration server sends one or more administrative messages to the interconnect hub. In response to the interconnect hub receiving, transmitting, and reading one or more administrative messages in the administrative messaging session, the interconnect hub captures operational performance data (or communications performance data) based on the administrative messages and produces a data record for each individual administrative messaging session based on the captured data. The operational performance data includes a time when one or more administrative messages in individual administrative messaging sessions were received or transmitted by the interconnect hub and a time difference between the determined times. The data record contains an identifier for the visited network provider and one or more of the determined time and time differences. The time differences may include a latency associated with the interconnect hub, a latency associated with the home administration server, or both. The interconnect hub can aggregate and save the data records in a data repository. In other words, the interconnect hub can continuously produce and add a data record into the data repository as it captures operational performance data from an administrative messaging session. The data repository contains prior produced records, and subsequent data records can be added to the prior produced records to update the data repository so the data repository has the most recent and relevant data records.

The interconnect hub further comprises an analytics server that stores and uses a set of customizable rules (e.g., parameters and conditions) to specify one or more alerts with respect to one or more operational relationships between individual home networks (or their administrative servers) and individual visited networks (or their administrative servers). The alerts may be specified for operational relationships during administrative messaging sessions and/or roaming sessions. The rules are customizable through a user interface of the analytics server. The analytics server applies the customizable rules to the aggregated data in the data repository on a continuous basis. When one of the customizable rules is satisfied, the analytics server generates an alert message for comprising information about a particular operating condition generated based on the administrative messages handled by the interconnect hub. Continuous application means that the rules are applied to the aggregated data as the data repository receives a data record (the aggregated data includes the subsequently received data record). The analytics server checks if the aggregated data including the most recent data record meets the rules, and generates an alert message if the aggregated data does. The analytics server checks the aggregated data based on a time rolling window that extends from the most recent received data record back to a previous data record that is captured or produced at a time that corresponds to the duration of the window. The analytics server checks all the data that falls in that duration, and the duration can be defined through the customizable rules. The particular operating condition refers to the condition in the alert description section in FIGS. 11-15. The interconnect hub may be used to generate alerts for home network providers so home network providers know the operational status between their administrative servers and the visited administrative servers.

Each of the system, server, computing device, and computer described in this application can be implemented on one or more computer systems and be configured to communicate over a network. They all may also be implemented on one single computer system. In one embodiment, the computer system includes a bus or other communication mechanism for communicating information, and a hardware processor coupled with bus for processing information.

The computer system also includes a main memory, such as a random access memory (RAM) or other dynamic storage device, coupled to bus for storing information and instructions to be executed by processor. Main memory also may be used for storing temporary variables or other intermediate information during execution of instructions to be executed by processor. Such instructions, when stored in non-transitory storage media accessible to processor, render computer system into a special-purpose machine that is customized to perform the operations specified in the instructions.

The computer system further includes a read only memory (ROM) or other static storage device coupled to bus for storing static information and instructions for processor. A storage device, such as a magnetic disk or optical disk, is provided and coupled to bus for storing information and instructions.

The computer system may be coupled via bus to a display, such as a cathode ray tube (CRT), for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

The computer system may implement the techniques described herein using customized hard-wired logic, one or more ASICs or FPGAs, firmware and/or program logic which in combination with the computer system causes or programs computer system to be a special-purpose machine. According to one embodiment, the techniques herein are performed by the computer system in response to the processor executing one or more sequences of one or more instructions contained in main memory. Such instructions may be read into main memory from another storage medium, such as storage device. Execution of the sequences of instructions contained in main memory causes the processor to perform the process steps described herein. In alternative embodiments, hard-wired circuitry may be used in place of or in combination with software instructions.

The term storage media as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device. Volatile media includes dynamic memory, such as main memory. Common forms of storage media include, for example, a floppy disk, a flexible disk, hard disk, solid state drive, magnetic tape, or any other magnetic data storage medium, a CD- ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more instructions to the processor for execution. For example, the instructions may initially be carried on a magnetic disk or solid state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by the processor. The computer system also includes a communication interface coupled to bus. The communication interface provides a two-way data communication coupling to a network link that is connected to a local network. For example, the communication interface may be an integrated services digital network (ISDN) card, cable modem, satellite modem, or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

Network link typically provides data communication through one or more networks to other data devices. For instance, network link may provide a connection through local network to a host computer or to data equipment operated by an Internet Service Provider (ISP). ISP in turn provides data communication services through the world wide packet data communication network now commonly referred to as the "Internet." Local network and Internet both use electrical, electromagnetic or optical signals that carry digital data streams. The signals through the various networks and the signals on network link and through the communication interface, which carry the digital data to and from the computer system, are example forms of transmission media. The computer system can send messages and receive data, including program code, through the network (s), network link and the communication interface. In the Internet example, a server might transmit a requested code for an application program through Internet, ISP, local network and the communication interface.

The received code may be executed by the processor as it is received, and/or stored in storage device, or other non-volatile storage for later execution.

It should be understood that variations, clarifications, or modifications are contemplated. Applications of the technology to other fields are also contemplated.

Exemplary systems, devices, components, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes user intervention or manual operation. It is understood from the above description that the functionality and features of the systems, devices, components, or methods of embodiments of the present invention include generating and sending signals to accomplish the actions.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention It should be understood that combinations of described features or steps are contemplated even if they are not described directly together or not in the same context. The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

It should be understood that the above-described examples are merely illustrative of some of the many specific examples that represent the principles described herein. Clearly, those skilled in the art can readily devise numerous other arrangements without departing from the scope as defined by the following claims.

The invention claimed is:

1. A WiFi roaming settlement and authorization system comprising:
an interconnect hub that interconnects a plurality of administration servers of different visited network providers with a plurality of administration servers of different home network providers and that includes a computing device configured using computer executable instructions and non-volatile memory, the administration servers of different visited network providers establish individual administrative messaging sessions in response to the administration servers of different visited network providers receiving individual requests from subscriber devices to join a visited WiFi network of the visited network provider, each session is between an administration server of a visited network provider and an administration server of a home network provider determined by the computing device to be associated with the subscriber device,
the computing device is further configured to determine that the administration server of the home network provider sent a message through the interconnect hub that authorized the requesting subscriber device to join the visited WiFi network to establish a roaming session on the visited WiFi network;
and wherein the computing device captures operational performance data based on the administrative messages that comprises determining a time when one or more messages in individual administrative messaging sessions were received or transmitted by the interconnect hub, calculates one or more differences between the determined times in the administrative messaging session, produces a data record for individual administrative messaging sessions that contains an identifier for the visited network provider and contains one or more of the determined time and time differences in association with the home network provider;
wherein the interconnect hub further comprises an analytics server configured using computer executable instructions and non-volatile memory, that uses a set of customizable rules to specify one or more technical alerts with respect to one or more operational relationships between individual administration servers of different visited network providers and individual administration servers of different home network providers.

2. The system according to claim 1, wherein the analytics server applies the customizable rules to the aggregated data in the data repository on a continuous basis.

3. The system according to claim 2, wherein the analytics server generates an alert message for the home network provider when one of the customizable rules is satisfied.

4. The system according to claim 3, wherein the alert message comprises information about a particular operating condition generated based on the administrative messages handled by the interconnect hub.

5. The system according to claim 1, wherein the calculated time differences includes a time difference between the time the interconnect hub receives an administrative message from the visited network provider and the time the interconnect hub transmits the administrative message to the visited network provider.

6. The system according to claim 5, wherein the received administrative message is forwarded to the home network provider before the interconnect hub transmits the administrative message to the visited network provider.

7. The system according to claim 1, wherein the calculated time differences includes a time difference that represents a latency of the interconnect hub.

8. The system according to claim 1, wherein the calculated time differences includes a time difference that represents a latency of an administration server of the home network provider.

9. A system comprising:
a data hub comprising one or more computers that interconnect home network providers with visited network providers that provide wireless network services to devices of the home network providers, wherein the data hub communicates accounting and authorization messages between administrative servers of the visited network providers and administrative servers of the home network providers;
the data hub being further configured to collect accounting information from the accounting messages and use the information in settling financial costs for the use of the services of the visited network provider and to collect and calculate other data from the accounting and authorization messages and apply rules to the other data that are configured to indicate the communications performance of the visited network provider in relation to the home network provider.

10. The system according to claim 9, wherein the data hub is further configured to receive messages from the visited administrative servers requesting the use of the services provided by the visited network provider.

11. The system according to claim 10, wherein the visited administrative servers receives the messages requesting the use of the services of the visited network provider from the devices of the home network providers.

12. The system according to claim 10, wherein the data hub is further configured to forward the received messages to the home administrative servers.

13. The system according to claim 12, wherein the home administrative servers are configured to generate messages in response to the received messages and send the generated messages to the data hub.

14. The system according to claim 13, wherein the data hub is further configured to forward the generated messages to the visited administrative servers.

15. The system according to claim 9, wherein the calculated other data includes a time when the data hub receives or transmits a message and a time difference between the time the data hub receives the message and the time the data hub transmits the message.

16. The system according to claim 9, wherein the data hub further comprises an analytics server that stores and applies the rules and that allows users of the system to customize the rules to generate one or more alerts including the communications performance information.

17. The system according to claim 16, wherein the data hub is further configured to aggregate collected data and the analytics server applies the rules to the aggregated data on a continuous basis based on a rolling time window that extends from the most recent collected other data back to a previous collected other data.

18. The system according to claim 17, wherein the analytics server generates the one or more alerts when one of the rules is satisfied.

19. A computer implemented method comprising:
establishing an administrative messaging session comprising administrative messages between a plurality of administrative servers of different visited network providers and a plurality of administrative servers of different home network providers, wherein the step of establishing is executed in response to requests from subscriber devices of the home network providers to join visited WiFi networks provided by the visited network providers and the session is between one of the visited network providers and the home network provider associated with the subscriber device;
reading, by an interconnect hub interconnecting the visited administrative servers and the home administrative servers, one or more administrative messages in individual administrative messaging sessions and in response, determining, by the interconnect hub, that the home network provider sent a message through the interconnect hub that authorized the requesting subscriber device to join the visited WiFi network to establish a roaming session on the visited WiFi network;
performing, by the interconnect hub, settlement logic for the roaming session between the visited network provider and the home network provider based on the information read from the one or more administrative messages in the individual administrative messaging session;
in response to receiving, transmitting, and reading one or more administrative messages, capturing, by the interconnect hub, operational performance data based on the administrative messages that comprises determining a time when one or more messages in individual administrative messaging sessions were received or transmitted by the interconnect hub, calculating, by the interconnect hub, one or more differences between the determined times in the administrative messaging session, producing, by the interconnect hub, a data record for individual administrative messaging sessions that contains an identifier for the visited network provider and contains one or more of the determined time and time differences in association with the home network provider;
using a set of customizable rules, through an analytics server configured using computer executable instructions and non-volatile memory, to specify one or more technical alerts with respect to one or more operational relationships between individual home networks and individual visited networks.

20. The method according to claim 19, further comprising applying the customizable rules, by the analytics server, to the aggregated data in the data repository on a continuous basis based on a rolling time window that extends from the most recent collected data back to a previous collected data.

\* \* \* \* \*